United States Patent
Otis, Jr. et al.

(10) Patent No.: US 11,904,548 B2
(45) Date of Patent: Feb. 20, 2024

(54) VARYING THE COMPOSITION OF BUILD MATERIALS USED FOR A THREE DIMENSIONAL PART

(71) Applicant: HEWLETT-PACKARD DEVELOPMENT COMPANY, L.P., Spring, TX (US)

(72) Inventors: David R. Otis, Jr., Corvallis, OR (US); Kevin E. Swier, Corvallis, OR (US); Adam Peter Franks, Grenoble (FR)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 336 days.

(21) Appl. No.: 16/608,854

(22) PCT Filed: Nov. 30, 2017

(86) PCT No.: PCT/US2017/063933
§ 371 (c)(1),
(2) Date: Oct. 27, 2019

(87) PCT Pub. No.: WO2019/108199
PCT Pub. Date: Jun. 6, 2019

(65) Prior Publication Data
US 2021/0276260 A1     Sep. 9, 2021

(51) Int. Cl.
*B29C 64/321* (2017.01)
*B33Y 10/00* (2015.01)
(Continued)

(52) U.S. Cl.
CPC ............ *B29C 64/321* (2017.08); *B22F 10/73* (2021.01); *B22F 12/52* (2021.01); *B22F 12/55* (2021.01);
(Continued)

(58) Field of Classification Search
None
See application file for complete search history.

(56) References Cited

U.S. PATENT DOCUMENTS

| 6,764,253 B1 | 7/2004 | Pfeiffer |
| 2006/0214335 A1* | 9/2006 | Cox ..................... B01F 23/69 425/375 |

(Continued)

FOREIGN PATENT DOCUMENTS

| CN | 105954074 A | 9/2016 |
| CN | 105965013 A | 9/2016 |

(Continued)

OTHER PUBLICATIONS

Kokkinis, D et al., Multimaterial Magnetically Assisted 3D Printing of Composite Materials, Oct. 23, 2015, https://www.nature.com/articles/ncomms9643.

*Primary Examiner* — S. Behrooz Ghorishi
(74) *Attorney, Agent, or Firm* — Shook, Hardy & Bacon L.L.P.

(57) ABSTRACT

A varying a composition of build material used for a three dimensional (3D) part formed by a 3D printer are disclosed. In a system provided, a number of vessels for build material are included, wherein each vessel includes a feeder coupled to a conveying system. The conveying system conveys and blends build material from the vessels. A controller is configured to adjust a composition of the build material by adjusting an amount of material added from each of the vessels by controlling the feeder on each of the vessels.

17 Claims, 13 Drawing Sheets

(51) Int. Cl.
  *B33Y 30/00* (2015.01)
  *B29C 64/357* (2017.01)
  *B29C 64/153* (2017.01)
  *B29C 64/336* (2017.01)
  *B33Y 40/00* (2020.01)
  *B22F 10/73* (2021.01)
  *B22F 12/52* (2021.01)
  *B22F 12/55* (2021.01)
  *B22F 12/58* (2021.01)
  *B22F 12/90* (2021.01)
  *B29K 105/26* (2006.01)

(52) U.S. Cl.
  CPC .............. *B22F 12/58* (2021.01); *B22F 12/90* (2021.01); *B29C 64/153* (2017.08); *B29C 64/336* (2017.08); *B29C 64/357* (2017.08); *B33Y 10/00* (2014.12); *B33Y 30/00* (2014.12); *B33Y 40/00* (2014.12); *B29K 2105/26* (2013.01)

(56) References Cited

U.S. PATENT DOCUMENTS

| | | |
|---|---|---|
| 2010/0140852 A1 | 6/2010 | Kritchman et al. |
| 2011/0079936 A1 | 4/2011 | Oxman |
| 2015/0266235 A1 | 9/2015 | Page |
| 2016/0318104 A1 | 11/2016 | Ott et al. |
| 2017/0008708 A1* | 1/2017 | Kirchhoff .......... B65G 53/4633 |
| 2017/0120331 A1 | 5/2017 | Ishida et al. |

FOREIGN PATENT DOCUMENTS

| | | |
|---|---|---|
| CN | 106163774 A | 11/2016 |
| CN | 106584638 A | 4/2017 |
| CN | 106738869 A | 5/2017 |
| EP | 1700686 B1 | 9/2006 |
| EP | 3112136 A3 | 1/2017 |
| EP | 3112136 A3 | 3/2017 |
| GB | 2392895 A | 3/2004 |
| WO | WO-2015108546 A2 | 7/2015 |
| WO | WO-2017100451 | 6/2017 |

* cited by examiner

400

800

VARYING THE COMPOSITION OF BUILD MATERIALS USED FOR A THREE DIMENSIONAL PART

BACKGROUND

Three-dimensional (3D) printing may produce a 3D object by adding successive layers of build material, such as powder, to a build platform, then selectively solidifying portions of each layer under computer control to produce the 3D object. The build material may be powder, or powder-like material, including metal, plastic, ceramic, composite material, and other powders. The powder may be formed from, or may include, short fibers that may have been cut into short lengths from long strands or threads of material. The objects formed can be various shapes and geometries, and may be produced using a model, such as a 3D model or other electronic data source. The fabrication may involve laser melting, laser sintering, heat sintering, electron beam melting, thermal fusion, and so on. The model and automated control may facilitate the layered manufacturing and additive fabrication.

DESCRIPTION OF THE DRAWINGS

Certain examples are described in the following detailed description and in reference to the following drawings.

DETAILED DESCRIPTION

Figure 1:
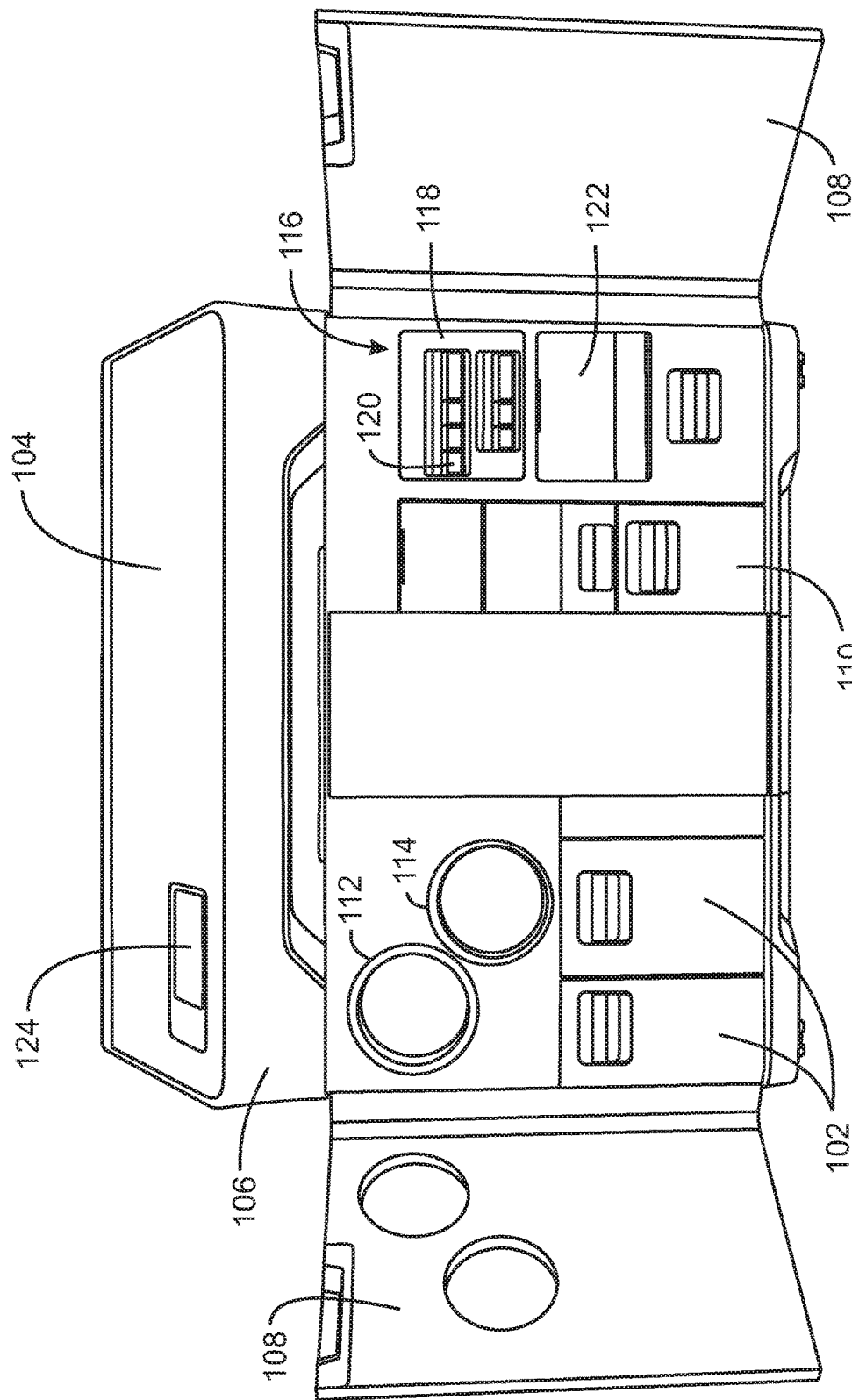
FIG. 1 is a drawing of a 3D printer, in accordance with examples.

Some types of three dimensional printers may form 3D objects from different kinds of powder or powder-like build material. The 3D objects are often made of layers formed from a generally uniform composition. However, it may be beneficial, in some circumstances, to vary the composition of build material between layers. For example, the amount of new material versus recycled material may be changed or other types of build material may be incorporated into layers. Examples described herein, provide systems and methods for varying the composition of build material between layers. Some examples enable the generation of 3D objects comprising layers of different mixtures of build materials.

The cost producing 3D objects is be related, at least in part, to the cost of the build material. Thus, there may be a desire for 3D printers to save build material after build operations, and utilize recycled material as build material. Recycled build material may include, for example, build material that was used during a 3D printing process but which was not solidified during the 3D printing process. Such non-solidified build material may be recovered once a 3D printing process has completed and may be designated 'recycled build material' and reused in other 3D printing processes. For some applications, there may be benefit in utilizing new material because of reasons such as product purity, strength, and finish in certain instances. For some applications, a mix of new and recycled build material may be used, for example as a compromise between low cost and acceptable 3D object properties. For example, in some examples using about 20% new and about 80% recycled build material may be acceptable from both an economic and a quality perspective. Other proportions of new and recycled build material may be used depending on build material properties and acceptable object quality characteristics.

As provided by examples described herein, the composition of build material may be changed between layers. In such examples, clearing a current build material from internal vessels may improve control over build material compositional changes. Internal vessels, such as hoppers, in the 3D printer may be used in a build material conveyance system to separate build material from conveying air, and provide the build material to other units, such as a build enclosure or a recycle supply station, among others. These hoppers may be sized to blend an amount of build material corresponding to a few layers, such as two to 10, rather than a larger number of layers, such as 20 or more.

In one example, the build material may be a dry, or substantially dry, powder. In a three-dimensional printing example, the build material may have an average volume-based cross-sectional particle diameter size of between about 5 and about 400 microns, between about 10 and about 200 microns, between about 15 and about 120 microns or between about 20 and about 70 microns. Other examples of suitable, average volume-based particle diameter ranges include about 5 to about 70 microns, or about 5 to about 35 microns. As used herein, a volume-based particle size is the size of a sphere that has the same volume as the powder particle. The average particle size is intended to indicate that most of the volume-based particle sizes in the container are of the mentioned size or size range. However, the build material may include particles of diameters outside of the mentioned range. For example, the particle sizes may be chosen to facilitate distributing build material layers having thicknesses of between about 10 and about 500 microns, or between about 10 and about 200 microns, or between about 15 and about 150 microns. One example of a manufacturing system may be pre-set to distribute powdered material layers of about 80 microns using build material containers that include build material having average volume-based particle diameters of between about 40 and about 60 microns. An additive manufacturing apparatus may also be configured or controlled to form powder layers having different layer thicknesses.

The build material can be, for example, a semi-crystalline thermoplastic material, a metal material, a plastic material, a composite material, a ceramic material, a glass material, a resin material, or a polymer material, among other types of build material. Further, the build material may include multi-layer structures wherein each particle comprises multiple layers. In some examples, a center of a build material particle may be a glass bead, having an outer layer comprising a plastic binder to agglomerate with other particles for forming the structure. Other materials, such as fibers, may be included to provide different properties, for example, strength or conductivity, among others.

The material handling system may mix recycle material and one or more new materials to provide a build material composition to be used in a 3D printing process. The 3D printers described herein may also provide for the recovery of excess or non-solidified build material at the end of a 3D printing process. The recovered material may be held in the printer for use in further build processes. In some examples, the recovered material may be moved into a build material container which may then be removed from the 3D printer for storage, recycling, or for later use. For example, intermediate vessels in the 3D printer, such as hoppers, may be emptied between build operations to facilitate a change in build material. The intermediate vessels may be emptied to storage vessels in the 3D printer, a removable build material container, or both.

FIG. 1 is a drawing of a 3D printer 100, in accordance with examples. The 3D printer 100 may be used to generate a 3D object from a build material, for example, on a build platform. The printer 100 may have covers or panels over compartments 102 for internal material vessels that hold build material. The internal material vessels may be removable via user-access to the compartments 102. The material vessels may discharge build material through feeders into an internal build material conveying system for the 3D printing. The 3D printer 100 may not be limited to using internal vessels for build material. External vessels, such as described with respect to FIGS. 3 and 4, may be coupled to the internal conveying system to allow the use of additional materials.

The printer 100 may have a controller to adjust operation of the feeders, both for internal vessels and, if attached, external vessels, to control the composition of build material for a layer. The controller may adjust the layer composition between layers, for example, changing the amounts of material added to the build material for different layers.

The printer 100 may have a housing, and components internal to the housing, for handling of build material. The printer 100 has a top surface 104, a lid 106, and doors or access panels 108. The access panels 108 may be locked during operation of the 3D printer 100. The printer 100 may include a compartment 110 for an additional internal material vessel such as a recovered material vessel holding recovered unfused or excess build material from a build enclosure of the printer 100.

The build material may be added or removed from the 3D printer through build material containers that are inserted into supply stations. The supply stations may include a new supply station 112 for the addition of new build material, and a recycle supply station 114 for the addition of recycled build material. The recycle supply station 114 may also be used to offload recovered build material, for example, from the recovered material vessel or a hopper, among others. In one example, a single supply station may be provided which may be used for both adding new build material and for removing recycled build material from the printer. In some examples, an external supply station may be added to provide additional build materials for different compositions.

In some examples, the 3D printer 100 may use a print liquid for use in a selective fusing or binding process, or other purposes, such as decoration. For examples of a 3D printer 100 that employ a print liquid, a print liquid system 116 may be included to receive and supply print liquid for the 3D printing. The print liquid system 116 includes a cartridge receiver assembly 118 to receive and secure print liquid cartridges 120 that are removable. The print liquid system 116 may include a reservoir assembly 122 having multiple vessels or reservoirs for holding print liquid collected from the print liquid cartridges 120 inserted into the cartridge receiver assembly 118. The print liquid may be provided from the vessels or reservoirs to the 3D printing process, for example, to a print assembly or printbar above a build enclosure and build platform.

The 3D printer 100 may also include a control interface 124, such as a control screen, panel, or external computing system, associated with a computing system or controller of the printer 100. The control interface 124 and computing system or controller may provide for control of functions of the printer 100 by a user. The fabrication of the 3D object in the 3D printer 100 may be under computer control. A data model of the object to be fabricated and automated control may direct the layered manufacturing and additive fabrication. The data model may be, for example, a computer aided design (CAD) model, a similar model, or other electronic source. The data model may include the shape that each layer is to be sintered to form, and the composition of the build material to be used for each layer, for example, a first group of layers of a build operation formed from a first composition of build material, and a next X layers formed from a second composition of build material. Other information could be included, such as melt temperature to fuse or sinter portions of a layer, changes in operation to improve adhesion between layers, and the like. During the construction of the model, compatibility of materials may be considered to allow adjoining layers to be formed from different materials of material compositions. Further, the controller may analyze the 3D object file before starting a build operation, and alert a user to incompatibilities before allowing build material to be loaded into the 3D printer. The controller is described in greater detail with respect to FIG. 6.

Figure 2:
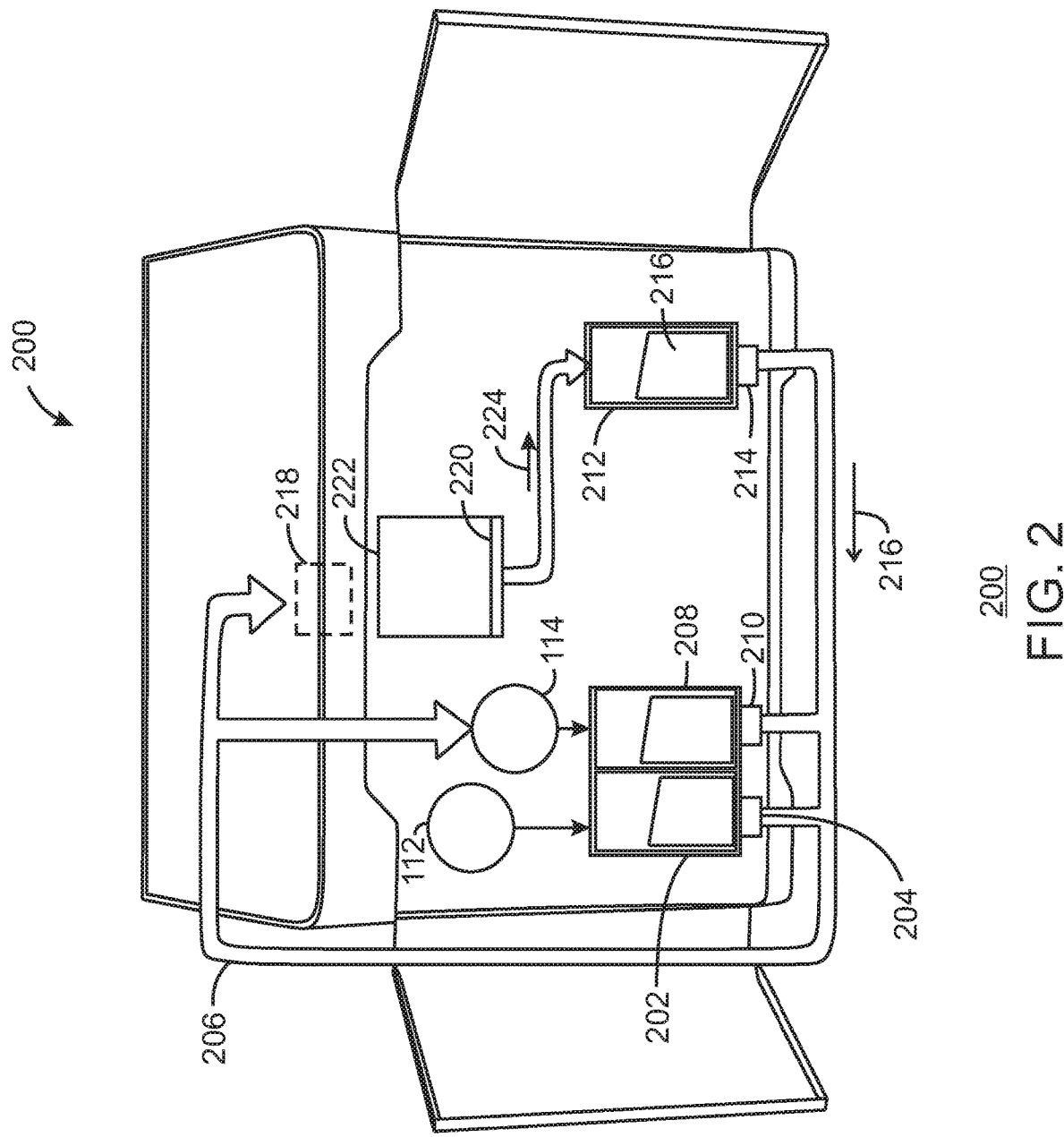
FIG. 2 is a schematic diagram of a 3D printer having an internal new material vessel that discharges new build material through a new feeder into a conveying system, in accordance with examples.

FIG. 2 is a schematic diagram of a 3D printer 200 having an internal new material vessel 202 that discharges new build material through a new feeder 204 into a conveying system 206, in accordance with examples. Like numbered items are as described with respect to FIG. 1. The printer 200 may include a recycle material vessel 208 to discharge recycle build material through a recycle feeder 210 to the conveying system 206. The printer 200 may have a controller to adjust operation of the feeders 204, 210 to maintain a composition and discharge rate of the build material for the 3D printing. Further, the printer 200 may include a recovered material vessel 212 to discharge recovered material 216 through a recovery feeder 214 into the conveying system 206. The conveying system 206 may transport the build material to a dispense vessel 218 which may supply build material for 3D printing. In the illustrated example, the dispense vessel 218 is disposed in an upper portion of the 3D printer 200. Moreover, although the conveying system 206 for the build material is depicted outside of the 3D printer 200 for clarity in this schematic view, the conveying system 206 is internal to the housing of the printer 200.

The 3D printer 200 may form a 3D object from the build material on a build platform 220 associated with a build enclosure 222. The 3D printing may include selective layer sintering (SLS), selective heat sintering (SHS), electron beam melting (EBM), thermal fusion, chemical binder systems, fusing agent, and fusing energy system, or any other 3D printing and additive manufacturing (AM) technologies based on solidifying portions of powder layers to generate the 3D object from the build material. Recovered build material 224, for example, non-solidified or excess build material, may be recovered from the build enclosure 222, for example, falling from the build platform 220, or being pulled from around the edges of the build enclosure 222 by a perimeter vacuum. The recovered build material 224 may be treated and returned to the recovered material vessel 212.

As described herein, a new supply station 112 and a recycle supply station 114 may hold build material containers inserted by a user. The supply stations 112 and 114 may provide new or recycled build material for the 3D printing to the new and recycle material vessels 202 and 208, respectively. Further, the conveying system 206 may return recovered material 216 to the recycle supply station 114. The recovered material 216 may be offloaded by being added to a build material container inserted in the recycle supply station 114, or may be diverted through the recycle supply station 114 to the recycle material vessel 208. The recovered material 216 may include build material obtained by emptying conveying lines and hoppers in the 3D printer.

In addition to the internal vessels 202, 208, and 212, the 3D printer 200 may be coupled to an external supply station. This is described further with respect to FIGS. 3 and 4.

Figure 3:
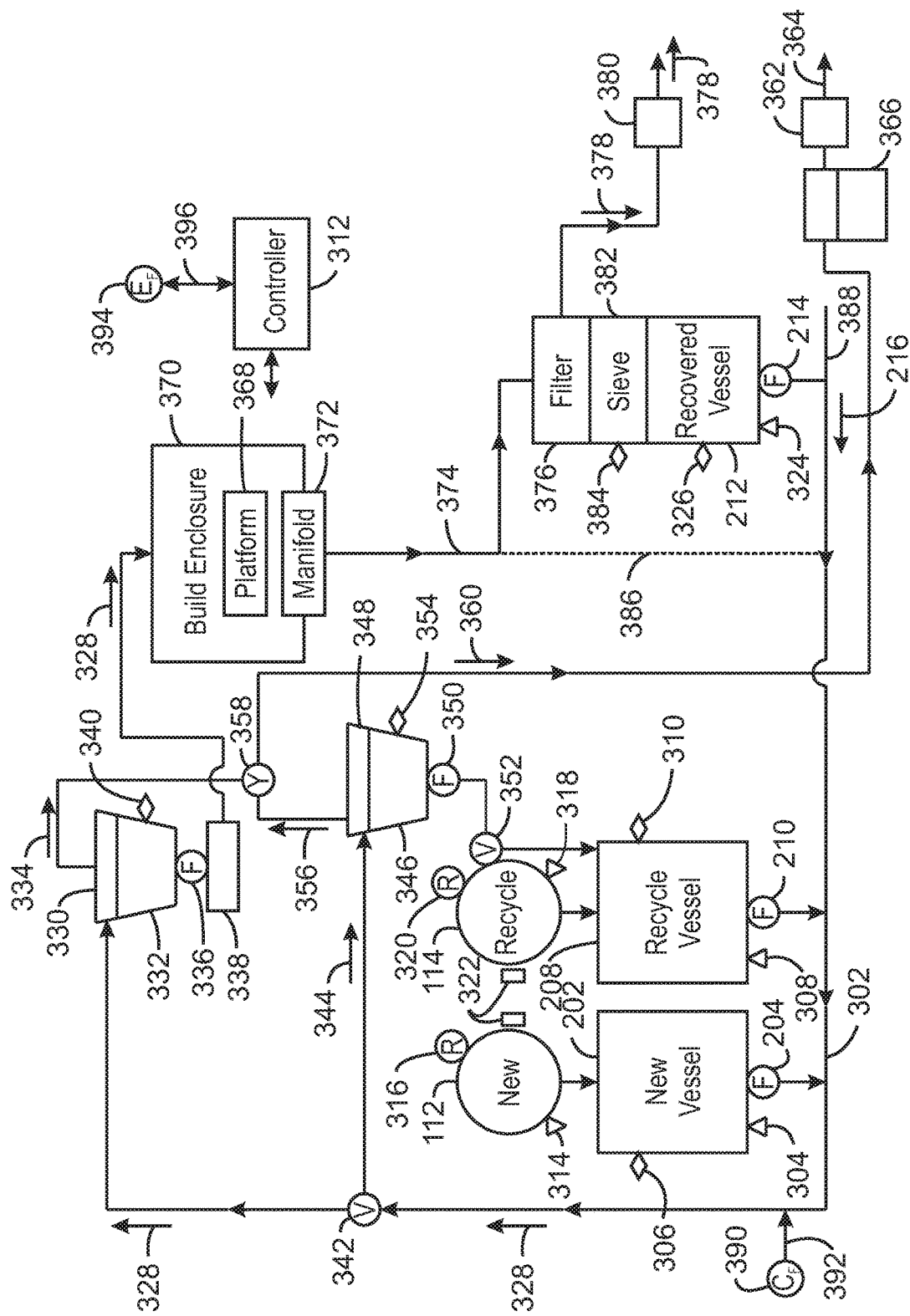
FIG. 3 is a block diagram of a 3D printer, in accordance with examples.

FIG. 3 is a block diagram of a 3D printer 300, in accordance with examples. Like numbered items are as described with respect to FIGS. 1 and 2. As shown in this drawing, material flows are shown by labelled arrows placed along conveying lines or conduits, which may be separately labeled. In this example, the 3D printer 300 may have a new material vessel 202 that discharges new material through a new feeder 204, such as a rotary feeder, auger, or screw feeder, into a conduit on a first conveying system 302, which may be a pneumatic conveying system. The new feeder 204 may meter or regulate material discharge or otherwise facilitate dispensing of the desired amount of new material from the new material vessel 202 into the first conveying system 302. In addition, the 3D printer 300 may include a recycle material vessel 208 that discharges recycle material through a recycle feeder 210 into the first conveying system 302.

The new material vessel 202 may have a weight sensor 304 and a fill level sensor 306. Likewise, the recycle material vessel 208 may have a weight sensor 308 and a fill level sensor 310. A controller 312 of the printer 300, as described with respect to FIG. 6, may adjust operation of the feeders 204 and 210 in response to indications of material discharge amount or rate provided by the weight sensors 304 and 308. The adjustment of the feeders 204 and 210 may be used to select a composition for the build material that may include material from the new material vessel 202, build material from the recycle material vessel. In examples described herein, the controller 312 may control the emptying of build material from internal lines and vessels in the 3D printer 300.

The 3D printer 300 may include a new supply station 112 to hold a build material container for adding new build material in a cylindrical cage, along a horizontal axis. The new material vessel 202 may receive new build material from the build material container held by the new supply station 112. As described herein, the new supply station 112 may include sensors and actuators to determine if a build material container is present, and to control the dispensing of build material from the build material container. The sensors may include a weighing device 314 that may be used to determine the weight of the new supply station 112 and the build material container. The actuators may include a motor 316 to rotate the cylindrical cage in a first angular direction to dispense build material to the new material vessel 202.

The number of rotations of the cylindrical cage may be used to control the dispensing of an expected amount of build material from a build material container. Accordingly, the motor 316 may be a stepper motor, a servo motor, or other type of motor that may be used to control the number of revolutions and the speed of the rotation. In some examples, a motor having a controlled speed, such as a motor control using pulse width modulation or pulse frequency modulation, may be used with a sensor that counts the number of revolutions. For example, a base position sensor as described herein may be used to count the revolutions.

The 3D printer 300 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The sensors may include a weighing device 318 that may be used to determine the weight of the recycle supply station 114 and a build material container. The actuators may include a motor 320 to rotate the cylindrical cage in a first angular direction to dispense build material to the recycle material vessel 208. The recycle supply station 114 may also rotate the cylindrical cage in a second angular direction, opposite the first angular direction, to add recovered or recycled material to the build material container.

The new supply station 112 and the recycle supply station 114 may also include other sensors and actuators 322 to provide functionality. A latching sensor may determine if a build material container is secured in a supply station, and a position sensor to determine if a build material container is in a base position, among others. As used herein, a base position is an initial position of the build material container after insertion into a supply station 112 or 114. In the base position, sensors and actuators 322 on a support structure may interact with the cylindrical cage. Further, the sensors and actuators 322 may include actuators to actuate a valve on the build material container, for example, opening or closing the valve, or advance the read head to an information chip on a build material container, among others.

As described herein, the printer 300 may include a recovered material vessel 212 which discharges recovered material 216 through a recovery feeder 214 into the first conveying system 302. The recovered material vessel 212 may have a weight sensor 324 and a fill level sensor 326. Accordingly, the build material 328 may include recovered material 216 from the recovered material vessel 212 in the build material in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material 328, for example, a mixture of new build material, recycled build material, or recovered material 216. In the illustrated example, the first conveying system 302 may convey the build material 328 to a separator 330 associated with a dispense vessel 332. The dispense vessel 332 may be a feed hopper. The separator 330 may include a cyclone, a screen, a filter, and the like. The separator 330 may separate conveying air 334 from the build material 328.

After the conveying air 334 has been separated, the build material 328 may flow into the dispense vessel 332. A feeder 336 may receive build material from the dispense vessel 332 and discharge the build material to a build material handling system 338. The dispense vessel 332 may have a fill level sensor 340. The fill level sensor 340 may measure and indicate the level or height of build material in the dispense vessel 332.

As described herein, once a build operation is finished, and a 3D part has been formed, the dispense vessel 332 may be emptied, or purged, through the feeder 336 to the build material handling system 338. The build material handling system 338 distributes build material across. The build material handling system 338 may then empty the residual build material 328 to the build enclosure 370, for example, to be formed into a layer. In some examples, the residual build material may be sent to a perimeter vacuum located around the edges of the build enclosure 370 without being used to form a layer. As described herein, the dispense vessel 332, or hopper, may be sized to hold a minimum working amount of build material in the dispense vessel 332, such as sufficient material to form about 10 layers, about 7 layers, about 5 layers, about 3 layers, or less.

The first conveying system 302 may divert build material 328 via a diverter valve 342. The diverted material 344 may be sent to an alternate vessel 346, or hopper, through a separator 348 such as cyclone, filter, etc. The alternate vessel 346 may discharge the diverted material 344 through a feeder 350 and diverter valve 352 to either a build material container in the supply station 114, or to the recycle material vessel 208.

As described for the dispense vessel 332, the alternate vessel 346 may be emptied at the end of the build cycle. This may be performed by sending any build material remaining in the alternate vessel 346, the first conveying system 302, or both, through the feeder 350 to the diverter valve 352. From the diverter valve 352, the remaining build material may be sent to a build material container inserted into the recycle supply station 114, or to the recycle material vessel 208. The design of the alternate vessel 346 may also be similar to that of the dispense vessel 332, for example, the alternate vessel 346 may be sized to hold a minimum working amount of build material.

The build material 328 may be diverted by the diverter valve 342 as diverted material 344 when the build material 328 is primarily recycle material or recovered material 216. This may be performed to offload build material, for example, by diverting the material through diverter valve 352 to a build material container. In other examples, the diverted material 344 may be sent by the diverter valve 352 to the recycle material vessel 208. As with other material vessels, the alternate vessel 346 may have a fill level sensor 354.

The separator 348 associated with the alternate vessel 346 may remove conveying air 356 from the build material 328. After the conveying air 356 is removed from the build material 328, the build material 328 may discharge from the separator 348 into the alternate vessel 346. In the illustrated example, the conveying air 356 from the separator 348 may flow to a Y-fitting 358, where the conveying air 356 is combined with the conveying air 334 from the separator 330 associated with the dispense vessel 332. The Y-fitting 358 may be a conduit fitting having two inlets and one outlet. The combined conveying air 360 may be pulled from the Y-fitting 358 by a motive component 362 of the first conveying system 302 and discharged 364 to the environment or to additional equipment for further processing. In some examples, the combined conveying air 360 may flow through a filter 366 as it is being pulled out by the motive component 362. The filter 366 may remove particulates from the conveying air 360 before it is discharged 364.

The motive component 362 provides motive force for the conveying air in the first conveying system 302 to transport build material. The motive component 362 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may distribute a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 300 may form a 3D object from build material 328 on the build platform 368. As described herein, this may be performed using any number of techniques, including, for example, a fusing solvent, laser sintering, a fusing liquid that activates on exposure to heat or other radiation, and the like.

After the 3D object is completed on the build platform 368, a vacuum manifold 372 may remove excess build material from the build enclosure 370 into a second conveying system 374 as recovered material. In some examples, a second conveying system 374 is not used. For example, the excess build material may be off-loaded with the 3D object or removed by a stand-alone vacuum.

If the second conveying system 374 is used, it may convey the recovered material through a cyclone or filter 376 to separate the recovered material from the conveying air 378. The conveying air 378 is discharged through a motive component 380 of the second conveying system 374. A filter may be included to remove particulates from the conveying air 378. The motive component 380 may be a blower, fan, eductor, ejector, vacuum pump, or other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212. In some examples, the recovered material may bypass the cyclone or filter 376, sieve 382, and recovered material vessel 212 and flow into a conduit of the first conveying system 302, as indicated by the dashed line 386. The vessels, conveying systems, and associated equipment of the 3D printer 300 may include instrumentation such as pressure sensors and temperature sensors, and the like. Further, the first conveying system 302 includes an air intake 388, positioned before the first vessel in the first conveying system 302, other air intakes may be present for the other conveying systems.

The first conveying system 302 may have an air coupling (Cf) 390, to allow an external supply station to be connected by a matching connector and provide other types of build material 328 through line 392 coupled to the first conveying system 302. An electrical coupling (Ef) 394 on a signal line 396, may be used to couple the electronics of external supply station to the controller 312 through a matching connector. The air coupling 390 and the electrical coupling 394 may be combined into a single connector. This may allow the controller 312 to detect when an external supply station is coupled to the 3D printer 300, allowing the controller 312 to query the external supply station for material types, operating characteristics, and other information. The controller 312 may then direct the external supply station to provide other material types that may be used in combinations with material from the new material vessel 202, the recycle material vessel 208, or the recovered vessel 212.

In some examples, a first type of build material 328 may be added through the new material vessel 202, diverted through the diverter valve 342 into alternate vessel 346, and used to fill the recycle material vessel 208. A second type of build material 328 may then be added to the new material vessel 202, providing two types of materials that may be used for forming different compositions of build material 328.

Figure 4:
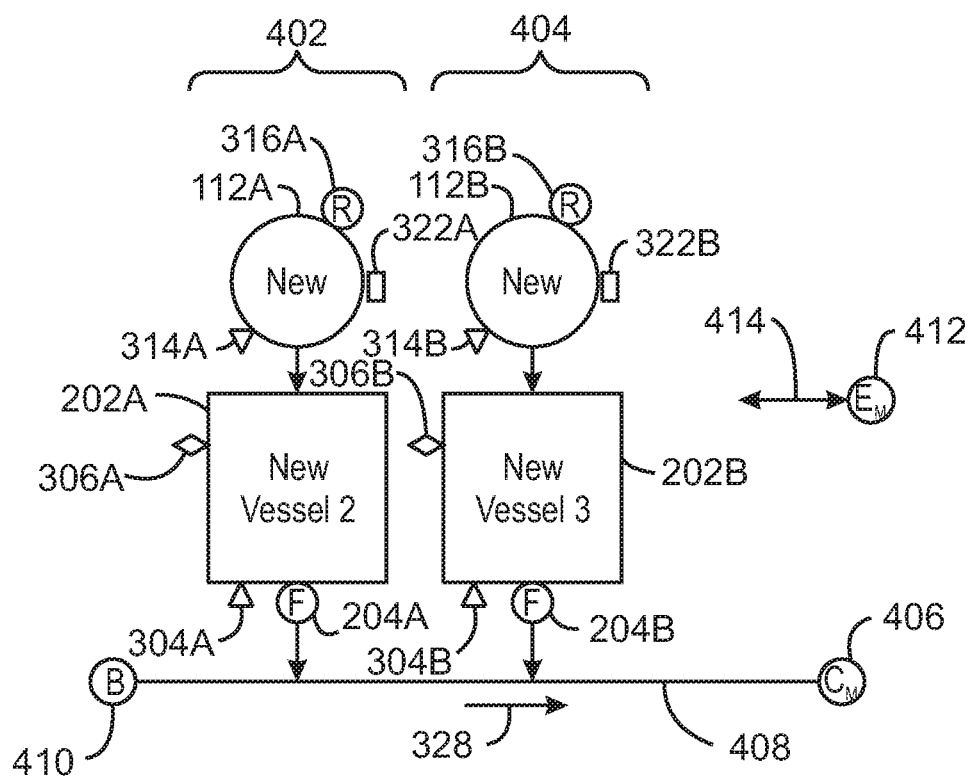
FIG. 4 is a block diagram of an external supply station, in accordance with examples.

FIG. 4 is a block diagram of an external supply station 400, in accordance with examples. The external supply station 400 includes two supply stations 402 and 404, for example, including new supply stations 112A and 112B. Numbered items that are labeled A and B in this example, are as described with respect to the similarly numbered items of FIGS. 1, 2, and 3. Referring also to FIG. 3, each supply station 402 or 404 may provide a different material to the 3D printer through the coupling, Cm, 406 configured to be coupled to a matching coupling, Cf, 390 on the first conveying system 302. The external new material vessels 202A and 202B feed a conveying line 408 through feeders 204A and 204B. To assist the first conveying system 302 of FIG. 3, a blower 410 may be included to move the build material 328 through the conveying line 408 to the coupling 406.

An electrical coupling (Em) 412 may be coupled to interface with the matching electrical coupling (Ef) 394 of FIG. 3 to facilitate control of the external supply station 400 from the controller 312 of FIG. 3. Signal lines 414 from the electrical coupling 412 may couple the controller to the sensors and actuators of the two supply stations 402 and 404, for example, to the motors 316A and 316B, the feeders 204A and 204B, the weight sensors 304A and 304B, the level sensors 306A and 306B, and the weight sensors 314A and 314B, among others. The two supply stations 402 and 404 may also include other sensors and actuators 322A and 322B to provide functionality.

When the controller 312 detects that the external supply station 400 has been coupled to the 3D printer 300, it may determine the types of material in each of the external new material vessels 202A and 202B. The controller 312 may then operate the feeders 204A and 204B, as well as the feeders inside the 3D printer 300, such as feeders 204, 210, and 214, to control the composition of the build material 328 used to form each layer. The blower 410 may be operated under the control of the controller 312, for example, being utilized when needed to move material from the external supply station 400 to the 3D printer 300.

The external supply station 400 is not limited to the configuration shown in FIG. 4. For example, more new supply stations may be included, one or more recycle supply stations may be included, and the like. Further, the compositional changes between layers described herein may be performed using build material 328 supplied from the vessels 202, 208, and 212, internal to the 3D printer 300.

Figure 5:
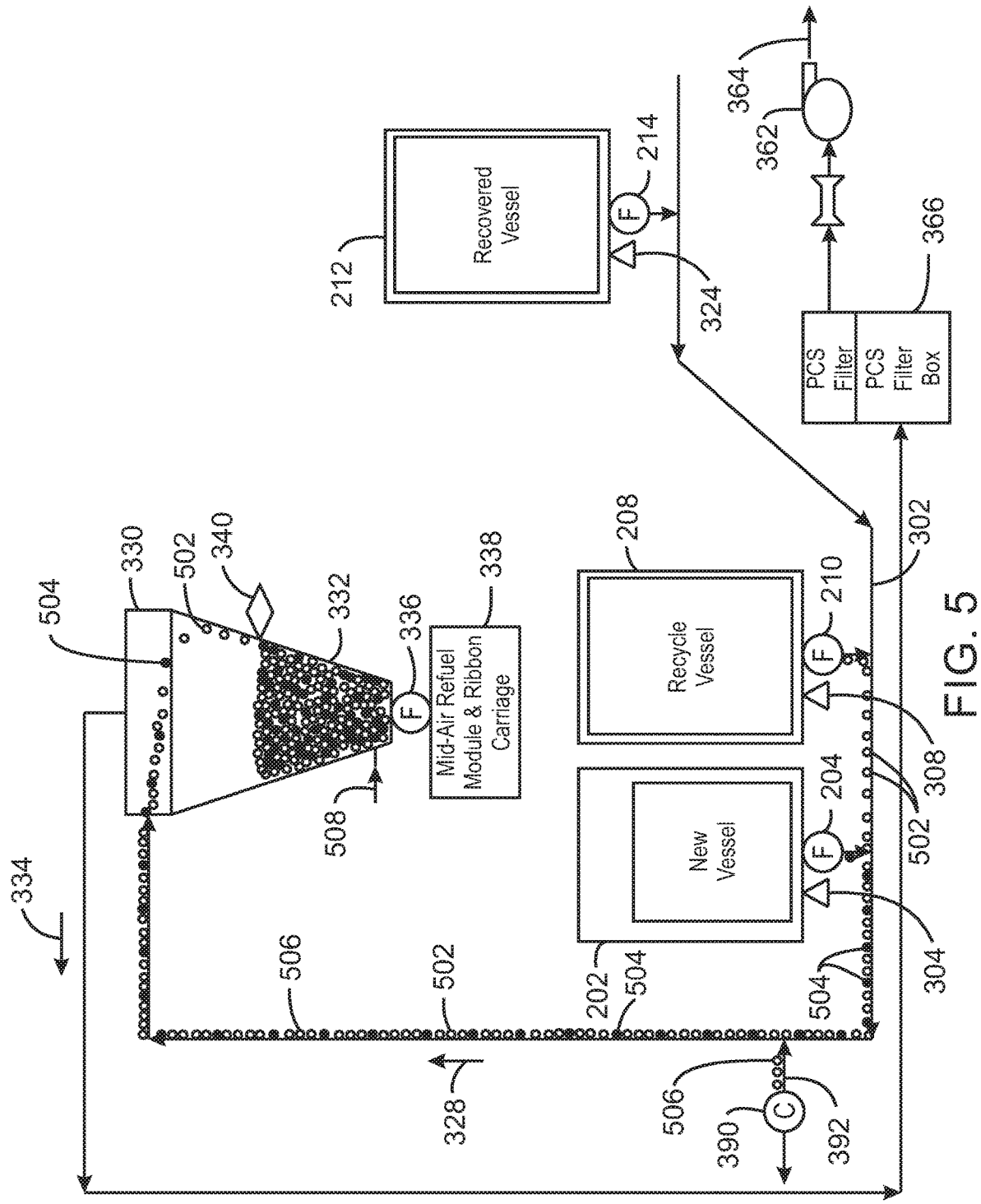
FIG. 5 is a schematic drawing of a blending procedure for forming a blend of build material for a layer of a 3D object, in accordance with examples.

FIG. 5 is a schematic drawing of a blending procedure for forming a blend of build material 328 for a layer of a 3D object, in accordance with examples. Like numbered items are as described with respect to FIGS. 2 and 3. A third build material 506 may be added to the first conveying system 302 from a coupling 390 attached to an external supply station.

The motive component 362, such as a blower, may pull air through the conduit at a velocity of between about 10 m/s and about 20 m/s. In this example, the recycle feeder 210 of the recycle material vessel 208 is used to add a first build material 502 from the recycle material vessel 208. The new feeder 204 on the new material vessel 202 adds a second build material 504 from the new material vessel 202 to the first conveying system 302. The addition of the build materials 502 and 504 to the first conveying system 302 overlap. Thus, the first build material 502 and the second build material 504 may initially be blended in the first conveying system 302.

The transit time in the first conveying system 302 may be less than about 1 second, as the length of the conveying system between the new feeder 204 and the dispense vessel 332, or hopper, may be less than about 3 m. The transit time for build material 328 from an external supply station may be about the same. The ratio of the materials from the different vessels may be controlled by the revolutions per minute (RPM) of the feeders 204, 210, and 214. To simplify FIG. 5, not every particle of the first build material 502 or the second build material 504 are labeled.

The build material 328 is separated from the airstream in the separator 330, or cyclone, and is dropped into the dispense vessel 332. At that point, the build material 328 has been mixed by the first conveying system 302. It may be further mixed by air blasts 508 directed through a microaerator at the base of the dispense vessel 332, just upstream of the feeder 336. The dispense vessel 332, or hopper, may be designed to enable mass flow so that there is a minimal stranding or segregation of build material 328. A feeder 336 at the bottom of the dispense vessel 332 may then provide the build material 328 to a build material handling system 338, such as a mid-air refuel module and ribbon cartridge, which may form the layers during the build operation.

Figure 6:
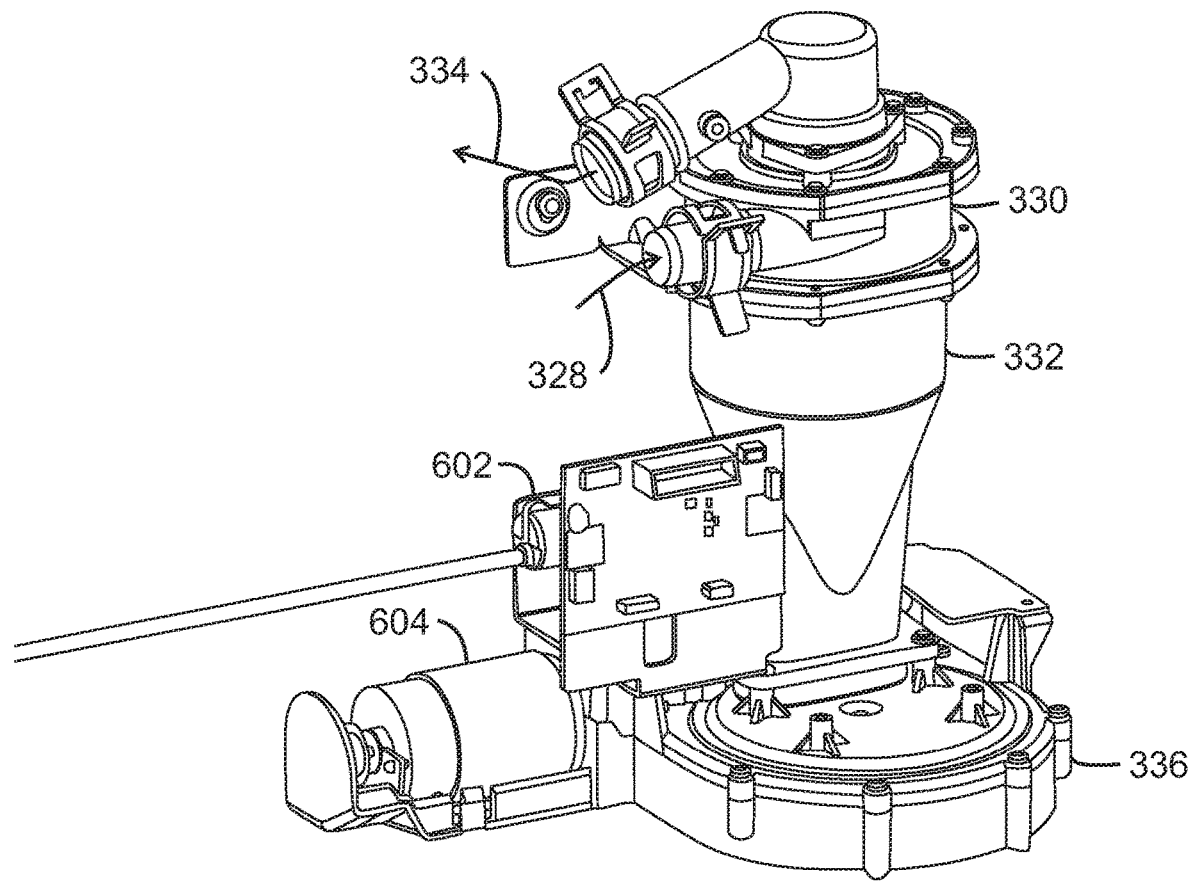
FIG. 6 is a drawing of a dispense vessel, or hopper, in a 3D printer, in accordance with examples.

FIG. 6 is a drawing 600 of a dispense vessel 332, or hopper, in a 3D printer, in accordance with examples. The dispense vessel 332 may have a level sensor 602 positioned between upper and lower portions of the dispense vessel 332, as described further with respect to FIG. 7.

A separator 330, or cyclone, positioned above the dispense vessel 332 receives an air stream conveying the build material 328. An air separator positioned at the center top of the separator 330 separates a stream of conveying air 334 from the separator 330, while the build material 328 drops into the dispense vessel 332.

From the dispense vessel 332, a feeder 336, such as a rotary valve driven by a motor 604, removes the material from the dispense vessel 332. The feeder 336 may send a build material 328 to a build material handling system 338 to form layers during the build operation.

Figure 7:
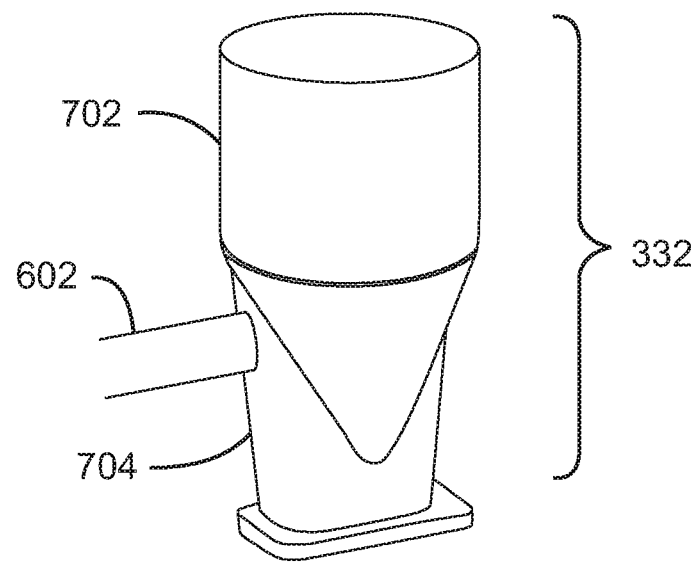
FIG. 7 is a drawing of the dispense vessel, showing the size differences between the upper portion and lower portion, in accordance with examples.

FIG. 7 is a drawing of the dispense vessel 332, showing the size differences between the upper portion 702 and lower portion 704, in accordance with examples. Like numbered items are as described with respect to FIG. 6. The upper portion 702 of the dispense vessel 332 may be located above the level sensor 602 and holds about 245 cm$^3$ of build material, and the lower portion 704 is located below the level sensor 602 and holds about 163 cm$^3$ of build material. Thus, the lower portion 704 of the dispense vessel 332, or hopper, is designed to hold less than about 200 cm$^3$, or approximately 80 g, of build material. Smaller vessels may be used to allow the formation of smaller blends, decreasing the number of layers for each composition.

The amount of build material in the lower portion 704 may be sufficient for about seven layers to about ten layers, depending on the layer thickness and the size of the build platform. The lower portion 704 may be emptied between layers. Further, the feeders 204, 210, and 214, as well as any feeders in external supply stations, may be controlled to minimize transitions between layers. In some examples, the micro-aerator may be disabled at the end of the transfer of build material 328 of a particular composition to enable build material of a new composition to be layered in the dispense vessel 332. The change in the composition of the build material 328 between layers may be limited to allow about seven layers to about ten layers to share a single composition prior to changing to a new composition. In this example, the dispense vessel 332 may be mostly or completely emptied prior to adding build material 328 having a new composition.

Figure 8:
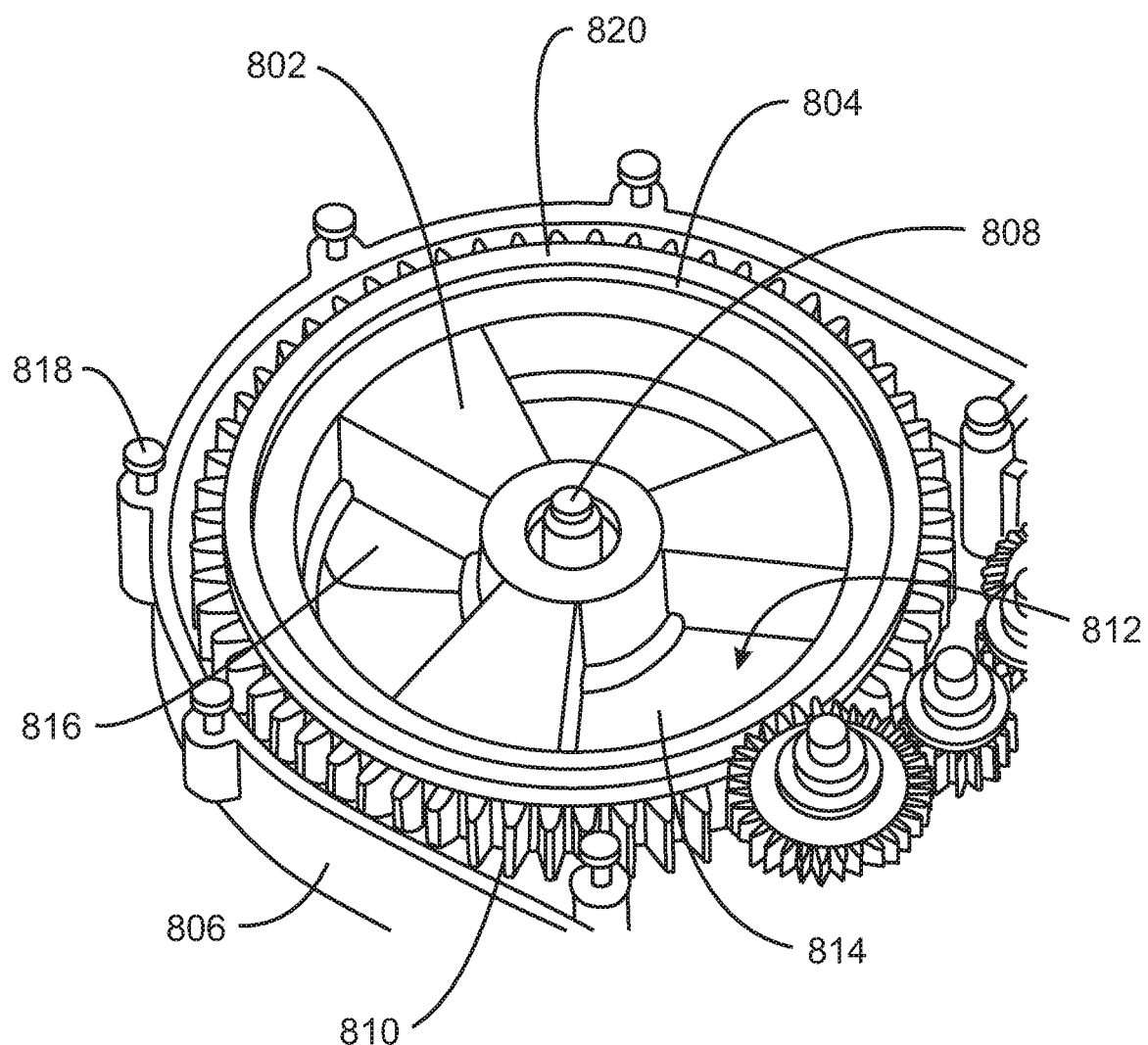
FIG. 8 is a rotary feeder of a 3D printer, in accordance with examples.

FIG. 8 is a rotary feeder 800 of a 3D printer, in accordance with examples. The rotary feeder 800 may be analogous to the feeders 204, 210, 214, 336, or feeders 204A and 204B, described with respect to FIGS. 2, 3, 4, and 5. In this example, the rotary feeder 800 has vanes (or spokes) 802 meeting an inside surface 804 of a housing 806 of the rotary feeder 800. The vanes 802 rotate within the inside surface 804. The vanes 802 may be secured within the rotary feeder 800 via a coupling element 808, such as a bolt, and may rotate around the coupling element 808. The feeder has drive elements 810, such as gears, to rotate the vanes 802. In operation, build material 812, such as powder from a material vessel, may flow into a cavity or pocket 814 between two vanes 802. In one example, the build material 812 may fall by gravity from the material vessel, such as vessels 202, 208, 212, or 332, or vessels 202A or 202B in an external feeder.

The rotary feeder 800 is depicted with three vanes 802 and three pockets 814 and, therefore, three pockets 814 per revolution. However, the rotary feeder 800 may have more or fewer pockets 814 per revolution. As for discharge, the rotary feeder 800 may have an opening 816 in the bottom portion of the rotary feeder 800 to discharge the build material 812, such as into a conduit of a conveying system. The feeder 800 may be mounted to the hopper through a fastener 818.

The amount of build material 812 discharged may be a function of the rotational speed of the vanes 802 around the coupling element 808, for example, in revolutions per minute. In some examples, each pocket 814 volume may be in the range of 2 cc to 15 cc, or 3 cc to 12 cc, or 4 cc to 10 cc, and the like. The number of pockets may be in the range of 3 to 10 pockets, 3 to 8 pockets, 3 to 6 pockets, 3 to 5 pockets, and so on.

A motor (e.g., a direct current or DC motor) may be employed under, for example, encoder control to control the RPM of the rotary feeder 800. In some examples, the rpm of the rotary feeder 800 in operation is in the range of 2 rpm to 20 rpm. There may be a gear train between the motor and the feeder wheel 820 and, therefore, the motor speed may be greater than the feeder rpm or pocket-wheel rpm. In operation in the 3D printer, the rotary feeder 800 rotation may be generally continuous. The rotation may also be intermittent. In one example cycle, the rotation is continuous for at least 25 seconds and off for less than 10 seconds. In another example, the rotation timing cycle is continuous for less than 2 seconds and off for more than 3 seconds. Other timing cycles are applicable. Rotation of a rotary feeder 800 may be stopped because a downstream receiver has an adequate amount of build material.

As noted, the composition of the build material may be controlled by the feeder valves. For example, if each pocket on the feeders holds the same amount of material, and each feeder has the same number of pockets, then rotating a feeder on a first vessel at two revolutions for every one revolution of a feeder on a second vessel may create a build material having about 0.66 parts of the build material from the first vessel and 0.33 parts of the build material from the second feeder. If each pocket holds about four grams, and each feeder has twelve pockets, then about four revolutions of the feeder on the first vessel and two revolutions of the feeder on the second vessel would produce about 72 grams of material, about seven layers to about ten layers. Any other combinations may be used for blends, for example, a combination of four materials in which two build materials are at 0.33 parts each, and two build materials are at 0.165 each may be formed by rotating the feeders on the vessels holding the first two build materials through two revolutions each, and the feeders on the vessels holding the second two build materials through one revolution each, producing about 72 grams of material for about seven layers to about ten layers.

The feeders may be changed to allow smaller amounts of blends to be made, lowering the number of layers at a single composition before a change in composition is made for a succeeding layer. For example, feeders may have pockets that have about two grams, about one gram, or less per pocket. If smaller pockets are used, more pockets may be included in each feeder, such as six pockets with each pocket holding about two grams, or twelve pockets with each pocket holding about one gram. A Hall effect sensor may be used on the rotary feeder 800 to better synchronize the pocket-drops of material. Further, different size feeders may be used for different build materials, such as smaller feeders for build materials that may be used in lower amounts.

The feeders are not limited to the rotary valve shown, but may instead be an auger or other device. These feeders may facilitate the formation of smaller amounts by allowing a more analog control of the feeder.

Figure 9:
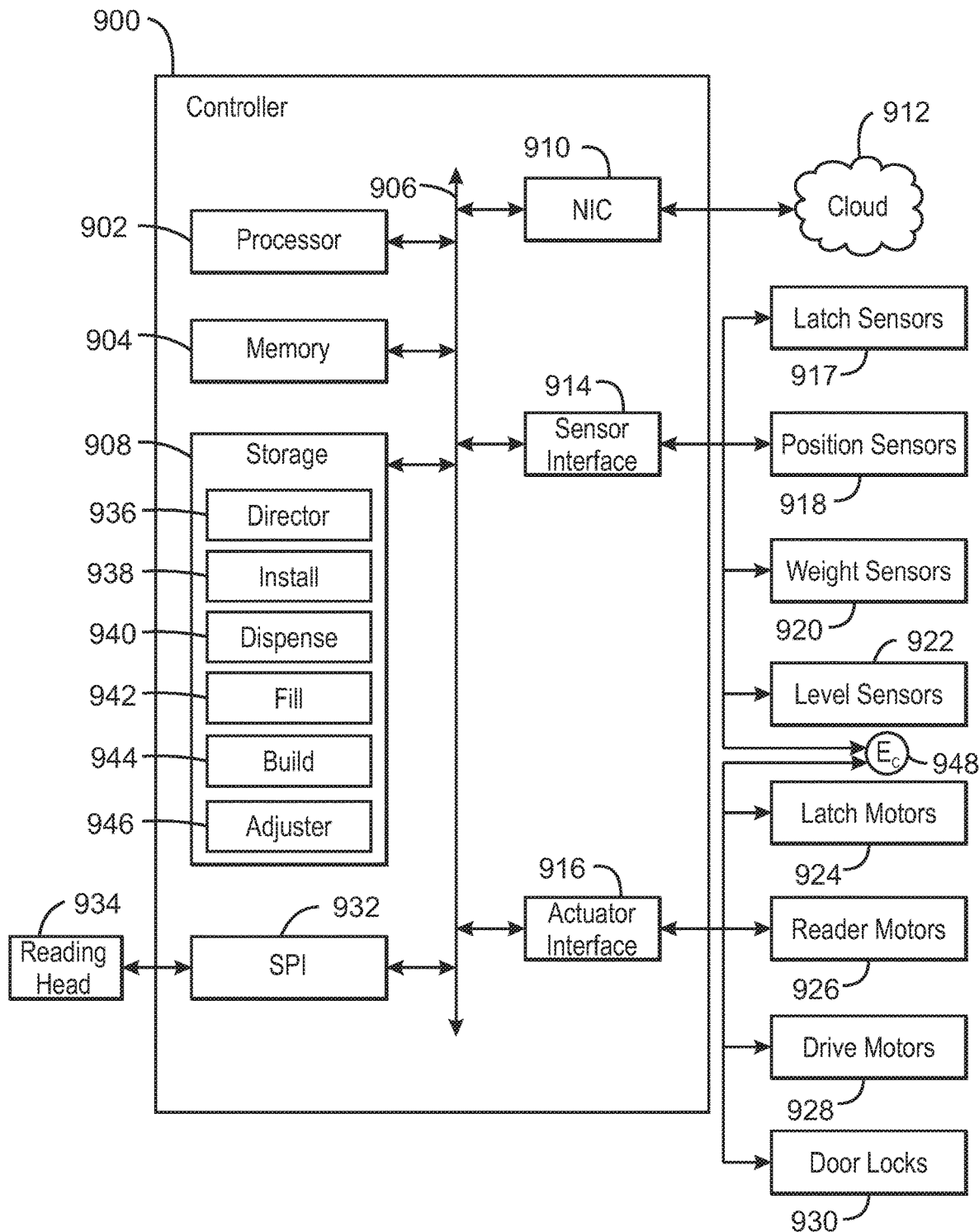
FIG. 9 is a block diagram of a controller for operating a supply station in a 3D printer, in accordance with examples.

FIG. 9 is a block diagram of a controller 900 for operating a supply station in a 3-dimensional printer, in accordance with examples. The controller 900 may be part of the main controller for the 3D printer, or a separate controller associated with the supply stations.

The controller 900 may include a processor 902, which may be a microprocessor, a multi-core processor, a multi-threaded processor, an ultra-low voltage processor, an embedded processor, or other type of processor. The processor 902 may be an integrated microcontroller in which the processor 902 and other components are formed on a single integrated circuit board, or a single integrated circuit, such a system on a chip (SoC). As an example, the processor 902 may include a processor from the Intel® Corporation of Santa Clara, Calif., such as a Quark™, an Atom™, an i3, an i5, an i7, or an MCU-class processor. Other processors that may be used may be obtained from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. The memory may be sized between about 2 GB and about 94 GB, or greater. The system memory 904 may be implemented using volatile memory devices, such as RAM or static RAM (SRAM). Further, nonvolatile memory may be used, such as memory modules having backup power, for example, from batteries, super-capacitors, or hybrid systems.

Persistent storage of information such as data, applications, operating systems, and so forth, may be performed by a mass storage 908 coupled to the processor 902 by the bus 906. The mass storage 908 may be implemented using a solid-state drive (SSD). Other devices that may be used for the mass storage 908 include flash memory cards, such as SD cards, microSD cards, xD picture cards, and the like, and USB flash drives. In some examples, the controller 900 may have an accessible interface, such as a USB connection, an SD card socket, or a micro-SD socket to all the insertion of memory devices with build plans, instructions, and the like.

In some examples, the mass storage 908 may be implemented using a hard disk drive (HDD) or micro HDD. Any number of other technologies may be used in examples for the mass storage 908, such resistance change memories, phase change memories, holographic memories, or chemical memories, among others.

The components may communicate over the bus 906. The bus 906 may include any number of technologies, such as industry standard architecture (ISA), extended ISA (EISA), peripheral component interconnect (PCI), peripheral component interconnect extended (PCIx), PCI express (PCIe), or any number of other technologies. The bus 906 may include proprietary bus technologies, for example, used in a SoC based system. Other bus systems may be included, such as an 120 interface, 130 interface, an SPI interface, point to point interfaces, and a power bus, among others. A network interface controller (NIC) 910 may be included to provide communications with a cloud 912 or network, such as a local area network (LAN), a wide area network (WAN), or the Internet.

The bus 906 may couple the processor 902 to interfaces 914 and 916 that are used to connect to other devices in the 3D printer. For example, as described with respect to FIG. 3, a sensor interface 914 may be used to couple to latch sensors 917 to detect if a build material container is latched in a supply station, and position sensors 918 to detect if a build material container is in a base position in a supply station. Other sensors that may be present in examples include weight sensors 920 to determine the weights of various containers or vessels, such as the supply stations, the new material vessel, the recycle material vessel, or the recovered material vessel, among others. Level sensors 922 may be coupled to the sensor interface 914 to monitor the level of build material in various vessels, such as the hoppers, the new material vessel, the recycle material vessel, or the recovered material vessel, among others. The level sensors may be used to determine if the level in the hopper is above the lower portion, and to control the addition of material to the hopper, for example, conveying material to a hopper until the level registers on the level sensor.

An actuator interface 916 may be included to control various actuators in the 3D printer. The actuators may include latch motors 924, to release build material containers from supply stations, and reader motors 926 to move reading heads towards, and away from, information chips on build material containers. Drive motors 928 may be used to rotate cylindrical cages that hold build material containers. The drive motors 928 may be stepper motors, server motors, or other kinds of motors that have rotation controlled by the supplied power signal, allowing the number of revolutions per minute in total revolutions to be controlled by the actuation. The drive motors 928 may include motors that rotate the feeders, forming different compositions of build material for different layers.

The actuation interface 916 may also couple to door locks 930 which may be used to lock the doors to prevent access to the build material containers while they are being moved. A serial peripheral interface (SPI) 932 may be coupled to the reading head 934 for interface with an information chip on a build material container. Other types of interfaces may also be used to read the information chip, such as a two wire 120 serial bus. In some examples, the information chip may be accessed through an RFI system.

While not shown, various other input/output (I/O) devices may be present within, or connected to, the controller 900. For example, a display panel may be included to show information, such as build information, action prompts, warnings of incorrect material, or messages concerning status of doors, build material containers, and the like. Audible alarms may be included to alert a user of a condition. An input device, such as a touch screen or keypad may be included to accept input, such as instructions on new builds, and the like.

The mass storage 908 may include modules to control the emptying of material from the hoppers, as described herein. Although shown as code blocks in the mass storage 908, it may be understood that any of the modules may be fully or partially implemented in hardwired circuits, for example, built into an application specific integrated circuit (ASIC). The modules may generally be used to implement the functions described with respect to FIGS. 10 and 11.

A director module 936 may implement the general functions for setting up the supply station and build operations. These may include the general operations not included in one of the more specific procedures, such as getting job instructions, estimating revolutions required to dispense or add build material, and moving recovered build material directly into the recycle material vessel past the recycle supply station. Other functions that may be handled by the director module 936 include the detection of a connected external supply station and the parameters, such as material type and feeder volumes, for the external supply station. Further, the director module 936 may analyze files to determine is the materials used for forming different compositions are compatible. The director module 936 may prevent the loading of incompatible build materials.

An install module 938 may implement an installation procedure for installing a build material container in a supply station, for example, determining if the build material container includes the correct material type, and rejecting the build material container if not, among others. A dispense module 940 may implement a dispense procedure used to dispense build material from a build material container, such as monitoring the number of revolutions of the build material container during the dispense procedure and the level of the vessel accepting the build material, among others. A fill module 942 may implement a fill procedure used to add build material to a build material container in the recycle supply station, such as when build material emptied from a hopper is added to a build material container.

A build module 944 may direct the build operation for forming the 3D object. The build module 944 may trigger instructions for changing the composition of build material between layers by triggering an adjuster module 946. The instructions, including the composition of the layers for the object, and the fusing procedures for the different compositions used in different layers, may be part of the build operation contained in a build file.

The adjuster module 946 may control the feeders for the different vessels to change the composition, such as described with respect to FIG. 8. The modules of the controller 900 may be used together to perform the methods of FIG. 10 or 11. An electrical coupling (Ec) 948 may be used to connect the controller 900 to an external supply station to provide the functionality described herein.

Figure 10:
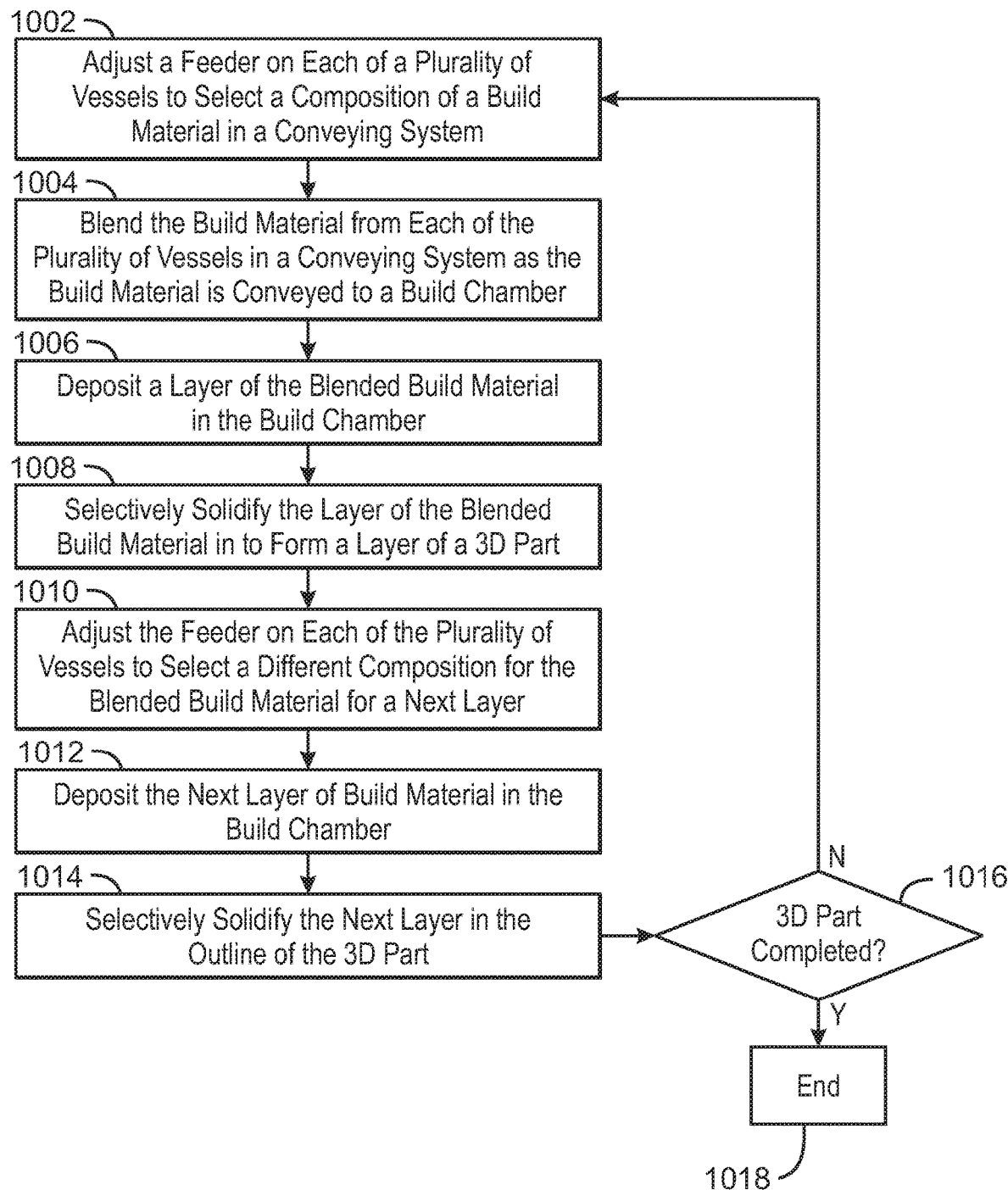
FIG. 10 is a process flow diagram of a method for operating a 3D printer, in accordance with examples.

FIG. 10 is a process flow diagram of a method 1000 for operating a 3D printer, in accordance with examples. The method 1000 may begin in the build operation at block 1002 when a feeder on each of a plurality of vessels is adjusted to select a composition of a build material in a conveying system. At block 1004, the build material from each of the plurality of vessels may be blended in the conveying system as the build material is conveyed to a dispense vessel to be fed to a build chamber. In some examples, no blending may be needed, such as if material in a recycle vessel already has a target composition. At block 1006, a layer of the blended build material may be formed in the build chamber. At block 1008, portions of the layer of the blended build material may be sintered or fused, or otherwise solidified, to form a layer of a 3D part. As described herein, the solidification may be performed by heat, by solvent, by chemical reaction, or by any combinations thereof.

At block 1010, the feeder on each of the plurality of vessels may be adjusted to select a different composition for the build material for a next layer. A number of layers may be formed at a first composition of build material before the composition of the build material is changed. For example, about seven layers to about ten layers may be formed at one composition of build material and sintered, during which the dispensing vessel, or hopper, is emptied. As described herein, fewer or greater numbers of layers may be formed, depending on the size of the hopper, the size of the build platform, and the like. The feeders may be adjusted to form a new composition of build material, which is conveyed to the hopper. At block 1012, a next layer may be formed of the new composition. At block 1014, portions of the next layer may be selectively solidified. As described for the first layers, a number of layers may be formed at the new composition, such as about seven layers to about ten layers, during which the dispensing vessel, or hopper, is emptied.

At block 1016, a determination is made as to whether the 3D part is completed. If not, process flow resumes at block 1002. If the 3D part is completed at block 1016, at block 1018, the process ends.

Figure 11:
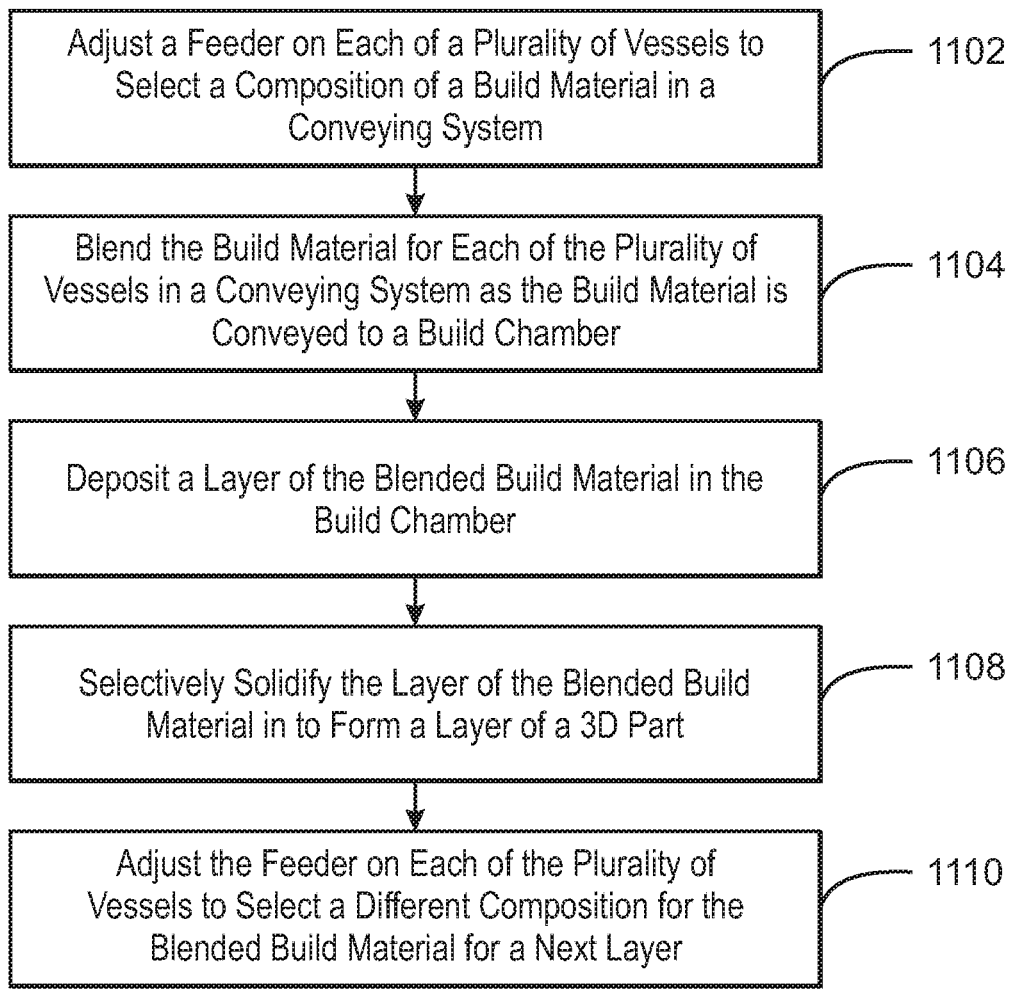
FIG. 11 is a simplified process flow diagram of a method for operating a 3D printer, in accordance with examples.

FIG. 11 is a simplified process flow diagram of a method 1100 for operating a 3D printer, in accordance with examples. The method 1100 may begin at block 1102, when a feeder on each of a plurality of vessels is adjusted to select a composition of a build material in a conveying system. At block 1104, the build material from each of the plurality of vessels is blended in the conveying system as the build material is conveyed to a dispense vessel to be fed to a build chamber. At block 1106, a layer of the blended build material may be formed in the build chamber. At block 1108, portions of the layer of the blended build material may be selectively solidified to form a layer of a 3D part. As described herein, the solidification may be performed by heat, by solvent, by chemical reaction, or by any combinations thereof. At block 1110, the feeder on each of the plurality of vessels may be adjusted to select a different composition for the build material for a next layer.

Figure 12:
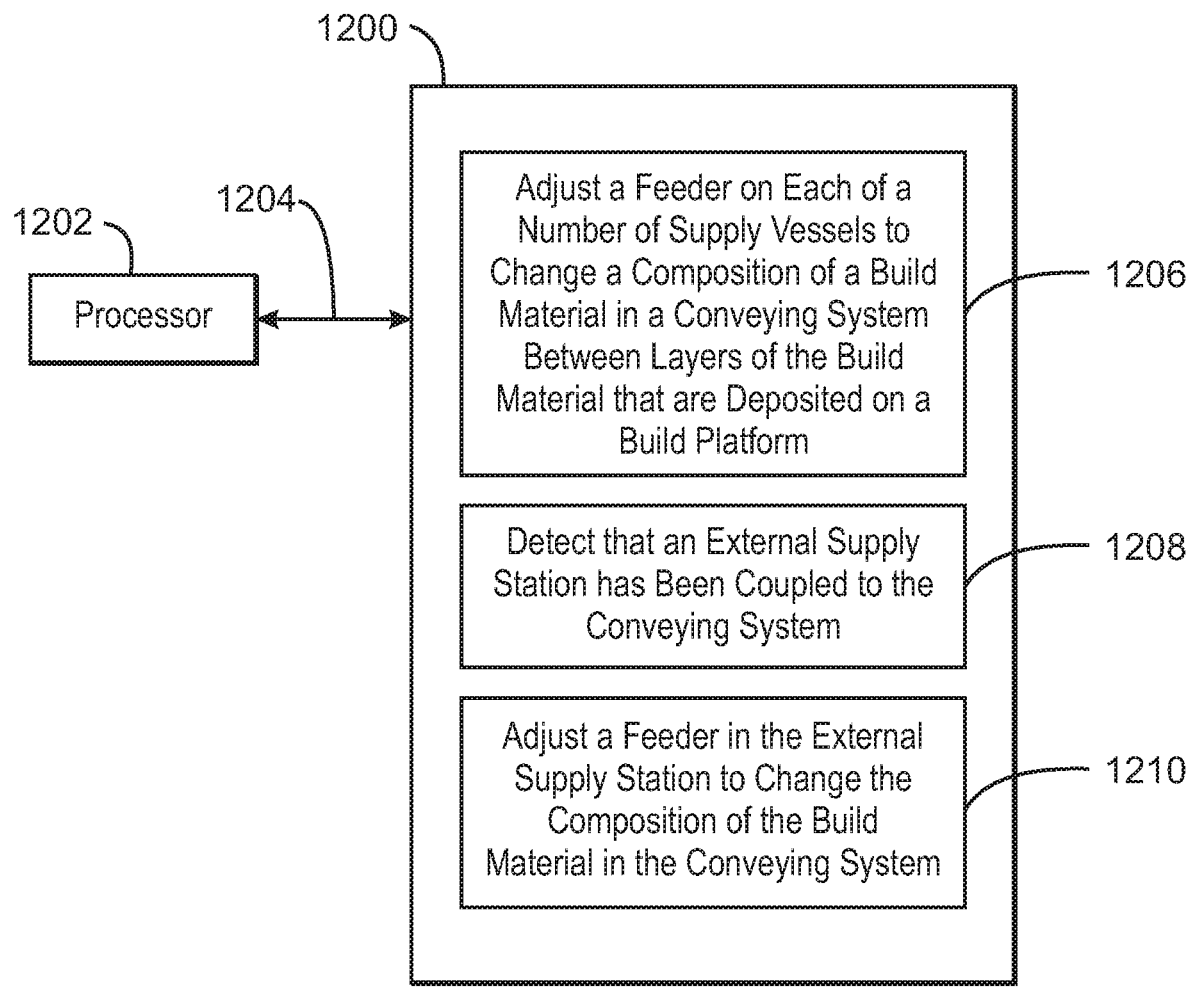
FIG. 12 is a block diagram of a non-transitory, machine readable medium including code to direct a processor to operate a 3D printer, in accordance with examples.

FIG. 12 is a block diagram of a non-transitory, machine readable medium including code to direct a processor 1202 to operate a 3D printer, in accordance with examples. The processor 1202 may access the non-transitory, machine readable medium 1200 over a bus 1204. The processor 1202 and bus 1204 may be as described with respect to the processor 902 and bus 906 of FIG. 9. The non-transitory, machine readable medium 1200 may include devices described for the mass storage 908 of FIG. 9 or may include optical disks, thumb drives, or any number of other hardware devices.

The non-transitory, machine readable medium 1200 may include code 1206 to direct the processor 1202 to adjust a feeder on each of a number of supply vessels to change a composition of a build material in a conveying system between layers the build material that are deposited on a build platform. The non-transitory, machine readable medium 1200 may also include code 1208 to direct the processor 1202 detect that an external supply station has been coupled to the conveying system. Code 1210 may be included to direct the processor 1202 to adjust a feeder in the external supply station to change the composition of the build material in the conveying system.

Figure 13:
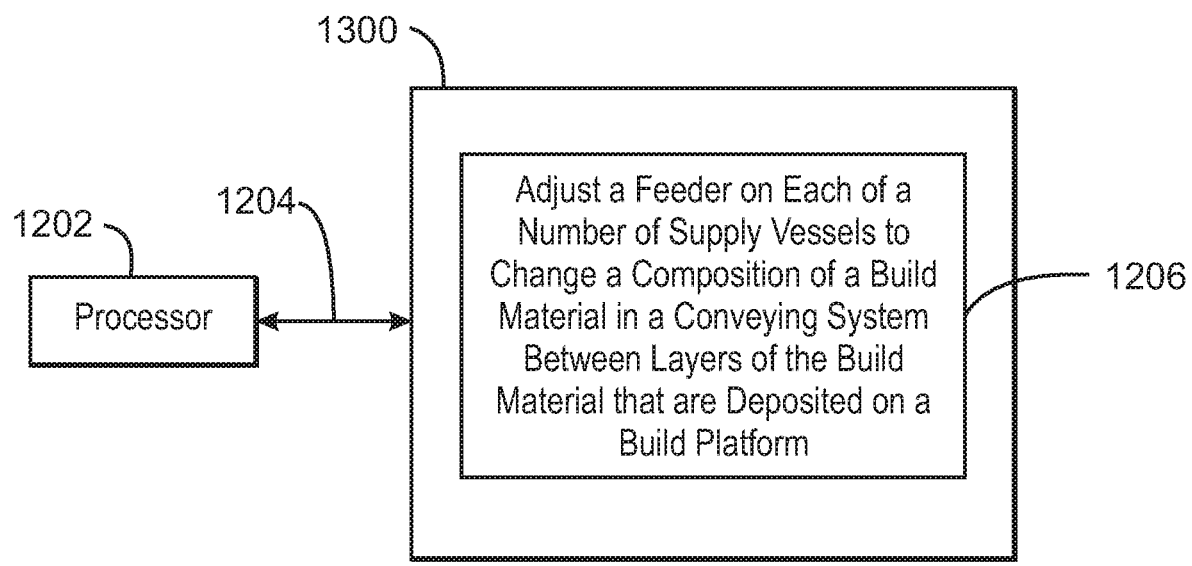
FIG. 13 is a simplified block diagram of a non-transitory, machine readable medium including code to operate a 3D printer, in accordance with examples.

FIG. 13 is a simplified block diagram of a non-transitory, machine readable medium 1300 including code to operate a 3D printer, in accordance with examples. Like numbered items are as described with respect to FIG. 12. The processor 1202, bus 1204, and machine readable medium 1300 may be as described with respect to the processor 1202, bus 1204, and machine readable medium 1200 of FIG. 12. Further, like numbered items are as described with respect to FIG. 12.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the present techniques.

What is claimed is:

1. A system for varying a composition of build material used for a three dimensional (3D) part formed by a 3D printer, comprising:
    a plurality of vessels each of which is for a build material of a plurality of build materials, wherein each vessel comprises a feeder coupled to a conveying system, and wherein the plurality of build materials includes a first build material and a second build material;
    the conveying system to convey, in a conduit, the plurality of build materials from the plurality of vessels to a dispensing vessel and blend the plurality of build materials within the conduit during conveyance to the dispensing vessel;
    the dispensing vessel containing an upper section, a lower section, and a building material sensor, the upper section positioned above the lower section and the building material sensor within the dispensing vessel, the upper section coupled to a separator that is coupled to the conveying system, the lower section coupled to another feeder for emptying build material from the dispensing vessel to a build platform; and a controller configured to adjust a composition of the build material by adjusting an amount of material added from each of the plurality of vessels by controlling the feeder on each of the plurality of vessels.

2. The system of claim 1, comprising a build file comprising the composition of build material to be used for a layer in the 3D part.

3. The system of claim 1, wherein the plurality of vessels include:
a new material vessel coupled to the conveying system by a new feeder;
a recycle material vessel coupled to the conveying system by a recycle feeder; and
a recovered material vessel coupled to the conveying system by a recovery feeder.

4. The system of claim 3, wherein the new feeder, the recycle feeder, or the recovery feeder comprises a rotary feeder comprising a plurality of pockets holding about 2 grams each of build material.

5. The system of claim 1, wherein the dispensing vessel is configured to hold less than about seven layers of build material.

6. The system of claim 1, comprising an external supply station configured to couple to the conveying system.

7. The system of claim 6, wherein the conveying system comprises a connector configured to couple to the external supply station.

8. The system of claim 7, wherein the external supply station comprises:
a material vessel;
a feeder for the material vessel; and
a matching connector configured to couple to the connector on the conveying system.

9. The system of claim 1, wherein the system further comprises a motive component coupled to the conveying system.

10. The system of claim 9, wherein the motive component includes at least one of the group consisting of a centrifugal blower, a fan, an axial blower, an eductor, an ejector, a vacuum pump, and a compressor.

11. The system of claim 1, wherein the upper section of the dispensing vessel includes an interior cavity of less than or equal to 245 cm3 for holding the building material.

12. The system of claim 1, wherein the lower section of the dispensing vessel includes an interior cavity of less than or equal to 200 cm3.

13. A method for operating a three dimensional (3D) printer, comprising:
adjusting a feeder on each of a plurality of vessels to select a composition of a build material in a conveying system;
blending the build material from each of the plurality of vessels in the conveying system as the build material is conveyed to a dispensing vessel;
depositing a layer of the blended build material in the dispensing vessel containing an upper section, a lower section, and a building material sensor, the upper section positioned above the lower section and the building material sensor within the dispensing vessel, the upper section coupled to a separator that is coupled to the conveying system, the lower section coupled to another feeder for depositing the blended build material from the dispensing vessel to a build chamber;
depositing a layer of the blended build material in the build chamber;
selectively solidifying portions of the layer of the blended build material to form a layer of a 3D part; and
adjusting the feeder on each of the plurality of vessels to select a different composition for a succeeding layer.

14. The method of claim 13, comprising:
depositing a next layer of the blended build material in the build chamber; and
selectively solidifying portions of the succeeding layer of the 3D part.

15. The method of claim 14, comprising changing the composition of the blended build material between a plurality of layers of the blended build material.

16. The method of claim 13, comprising adjusting a feeder in an external supply station to change the composition of the blended build material.

17. The method of claim 13, detecting that an external supply station has been coupled to the conveying system.

* * * * *